(12) United States Patent
Lipton (10) Patent No.: US 7,366,975 B1
(45) Date of Patent: Apr. 29, 2008

(54) METHOD AND APPARATUS FOR ALLOWING A MEDIA CLIENT TO OBTAIN MEDIA DATA FROM A MEDIA SERVER

(75) Inventor: Daniel I. Lipton, Belmont, CA (US)

(73) Assignee: Apple Inc, Cupertino, CA (US)

( * ) Notice: Subject to any disclaimer, the term of this patent is extended or adjusted under 35 U.S.C. 154(b) by 803 days.

(21) Appl. No.: 10/407,437

(22) Filed: Apr. 5, 2003

(51) Int. Cl.
   *G06F 17/00* (2006.01)
(52) U.S. Cl. .................. 715/500.1; 369/30.38
(58) Field of Classification Search ............. 715/500.1; 369/30.38
   See application file for complete search history.

(56) References Cited

U.S. PATENT DOCUMENTS

| | | | |
|---|---|---|---|
| 6,317,743 B1 * | 11/2001 | Heck | 707/10 |
| 6,317,761 B1 * | 11/2001 | Landsman et al. | 715/513 |
| 2001/0037399 A1 * | 11/2001 | Eylon et al. | 709/231 |
| 2003/0112258 A1 * | 6/2003 | Dietz et al. | 345/700 |

OTHER PUBLICATIONS

Miller, Gene, et al, "News On-Demand for Multimedia Networks", Proceedings of the First ACM International Conference on Multimedia, Sep. 1993, pp. 1-11.*
Akinlar, Cuneyt, et al, "A Scalable Distributed Multimedia File System Using Network Attached Autonomous Disks", Modeling, Analysis and Simulation of Computer and Telecommunication Systems, Sep. 2000, pp. 180-187.*

* cited by examiner

*Primary Examiner*—William Bashore
*Assistant Examiner*—Laurie Ries
(74) *Attorney, Agent, or Firm*—Adeli & Tollen LLP (57) ABSTRACT

Some embodiments of the invention provide a computer system that includes a media server, a media client, and a media-server interface. The media server application produces media data, where the media data has a plurality of segments. For example, in some embodiments, the media data is a movie with video and audio components. In this example, the segments of the movie can be specified in two groups, where one group includes the frames of video in the movie and the other group includes the seconds of audio in the movie. The media client application is typically an application that needs to process the media data of the media server application without the need to have any familiarity with the implementation of the media server application. The media-server interface directs the server application to successively generate individual segments of the media data and to store each generated segment in a location that is accessible by the media client. The server application generates each segment in a format that is comprehensible to the media client application. The media client application retrieves each segment from its stored location and processes the segment.

23 Claims, 5 Drawing Sheets

METHOD AND APPARATUS FOR ALLOWING A MEDIA CLIENT TO OBTAIN MEDIA DATA FROM A MEDIA SERVER

FIELD OF THE INVENTION

The present invention is directed towards method and apparatus for allowing a media client to obtain media data from a media server.

BACKGROUND OF THE INVENTION

There are numerous applications today for editing and creating multimedia presentations. Examples of such applications include Final Cut Pro® and iMovie®, both sold by Apple Computer, Inc. Such media editing applications often use a particular project file format (.pff) and have a particular rendering engine that are not familiar to other applications. This lack of familiarity is problematic in situations when the other applications want to analyze media items (e.g., movies) produced by the multimedia editing application.

In these situations, the current solution is to have the multimedia editing application export its media content (i.e., its media items) into a standard format (e.g., a Quicktime® format). Such an approach has several disadvantages. First, it is time consuming. Second, it often requires storing the exported content on disk. Third, the multimedia editing application often stores the exported content in a compressed fashion, which, in turn, increases the other application's processing time and reduces the quality of the multimedia content. Fourth, the cumbersome and inefficient exporting operation has to be repeated when the multimedia editing application modifies the previously exported media content. Therefore, there is a need in the art a method that allows one application (referred to below as the "media client") to have access to the media items of another application (referred to below as the "media server") without having any knowledge of the media server's implementation, such as its project file format, rendering engine, etc.

SUMMARY OF THE INVENTION

Some embodiments of the invention provide a computer system that includes a media server, a media client, and a media-server interface. The media server application produces media data, where the media data has a plurality of segments. For example, in some embodiments, the media data is a movie with video and audio components. In this example, the segments of the movie can be specified in two groups, where one group includes the frames of video in the movie and the other group includes the seconds of audio in the movie.

The media client application is typically an application that needs to process the media data of the media server application without the necessity to have any familiarity with the implementation of the media server application. The media-server interface directs the server application to successively generate individual segments of the media data and to store each generated segment in a location that is accessible by the media client. The server application generates each segment in a format that is comprehensible to the media client application. The media client application retrieves each segment from its stored location and processes the segment.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Figure 1:
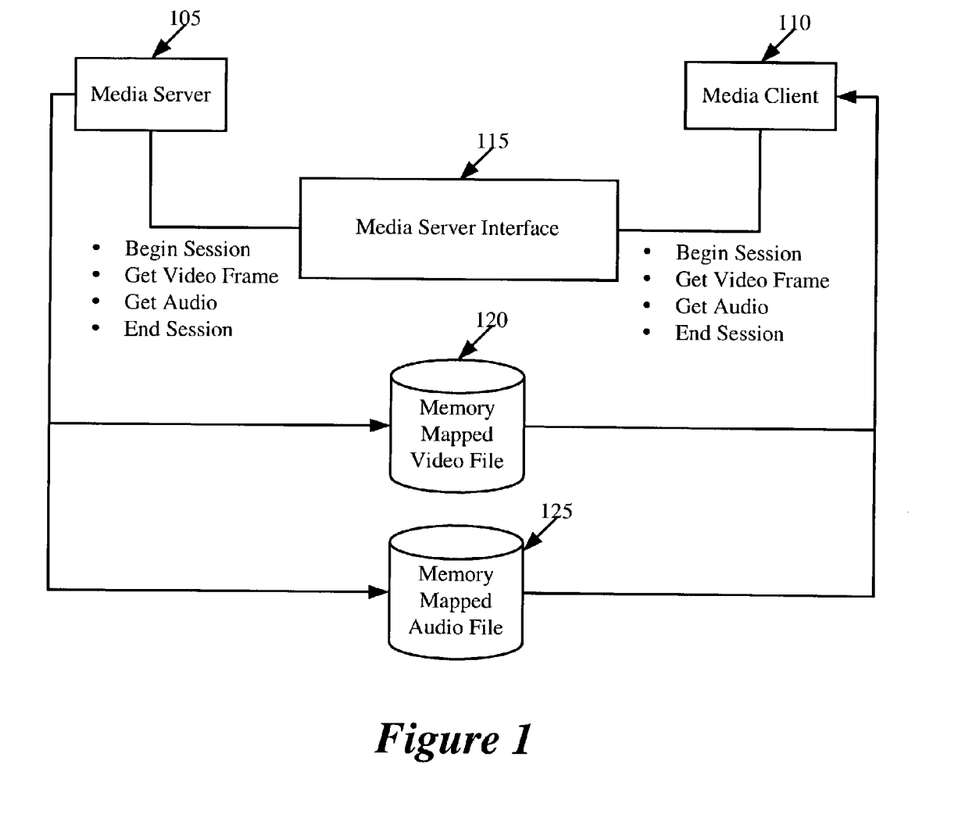
FIG. 1 illustrates the software architecture of a computer system that implements some embodiments of the invention.

Some embodiments of the invention allow a media client application to obtain media content from a media server application without having any familiarity with the media server application's specific implementation, such as the media server's project file format, rendering engine, etc. FIG. 1 illustrates the software architecture of a computer system that implements some embodiments of the invention. As shown in this figure, the computer system includes a media server application 105, a media client application 110, a media server interface 115, and memory mapped audio and video files.

The media server application 105 produces media content. In several embodiments described below, the media server application is a film editing application, such as Final Cut Pro® and iMovie® of Apple Computer, Inc. Hence, in these examples, the media content includes audio and video streams, where the video stream includes frames of video and the audio stream includes seconds of audio. One of ordinary skill will realize that other embodiments might use a different media server application that produces different media content, which might be divisible in different media segments.

The media client application 110 is an application that needs the media data of the media server application 105. The media client application 110 does not typically have any familiarity with of the media server application. The media client application can be any one of a variety of applications that need media data from the media server. For instance, the client might be an encoding application that encodes frames of video and seconds of audio according to a particular format.

The media-server interface 115 provides the interface through which the media client 110 and the media server 105 can communicate. In some embodiments, this interface is implemented as an OS X® framework. As shown in FIG. 1, this interface allows the media client to have access to the media content of the media server through four function calls, which are Begin Session, Get Video Frame, Get Audio Segment, and End Session. These functions are functions that are implemented by the media server 105. In some embodiments, the media server 105 registers these four functions (i.e., provides pointers to the locations of these functions in memory) with the interface when the media server launches. By registering these functions, the media server is notifying the interface that other applications (i.e., media clients) might send to the media server interface 115 function calls that include the name of these four functions and that are intended for the media server 105.

FIG. 1 pictorially illustrates this by showing the four potential function calls, Begin Session, Get Video Frame, Get Audio Segment, and End Session, originating from the media client. To implement the invention, some embodiments program each media client to be able to generate these four function calls in order to get media content from any media server associated with the media interface 115.

Each of the function calls will be further described below by reference to FIGS. 2-4. However, a brief description of them is as follows. Generally, the Begin Session call causes the interface 115 and media server 105 to prepare for a media exchange session. Part of the interface's preparation is to specify up to two memory-mapped files 120 and 125, where one file 120 is for storing and retrieving a video frame and the other file 125 is for storing and retrieving a second of audio. Part of the media server's preparation is to prepare itself for recording video and/or audio into these files based on a particular format of these files.

The Get Video Frame call causes the media server to render and store a video frame that is identified in the call in the memory-mapped video file 120. The media server stores a video frame in a well-known standard format (e.g., RGB, YUV, YCrCb, etc.) that the media client can decipher. As further described below, each time the media server stores such a frame, the media client 110 reads out this frame from the memory-mapped video file 120. This allows the memory-mapped video file to serve as the frame buffer for both the media server and media client. Provided that the computer system has sufficient memory, this frame buffer (i.e., the memory-mapped video file 120) can be contained entirely in the computer system memory (e.g., the RAM), which thereby allows the media server and media client to exchange video data without having to write the data first to disk. This speeds up the exchange of the video data considerably.

The Get Audio Segment call causes the media server to store a second of audio that is identified in the call in the memory-mapped audio file 125. The media server stores an audio frame in a format (e.g., PCM, etc.) that the media client can decipher. The number of samples included in a second of audio depends on the sampling rate of the audio. As further described below, each time the media server stores a second of audio in the file 125, the media client 110 reads out this data from the memory-mapped audio file 125. This allows the memory-mapped video file to serve as the audio buffer for both the media server and media client. Provided that the computer system has sufficient memory, this audio buffer (i.e., the memory-mapped video file 125) can be contained entirely in the computer system memory (e.g., the RAM), which thereby allows the media server and media client to exchange audio data without having to write the data first to disk. This speeds up the exchange of the audio data considerably.

The End Session call causes the interface 115 and media server 105 to terminate the media exchange session. To terminate such a session, the media server 105 restores its state to what it was before the session. Once the media server interface understands that the media server 105 and the media client 110 have terminated their session, the media server interface 115 terminates the session by performing certain operations, such as de-allocating the memory mapped files and the command pipes, which will be further described below.

Figure 2:
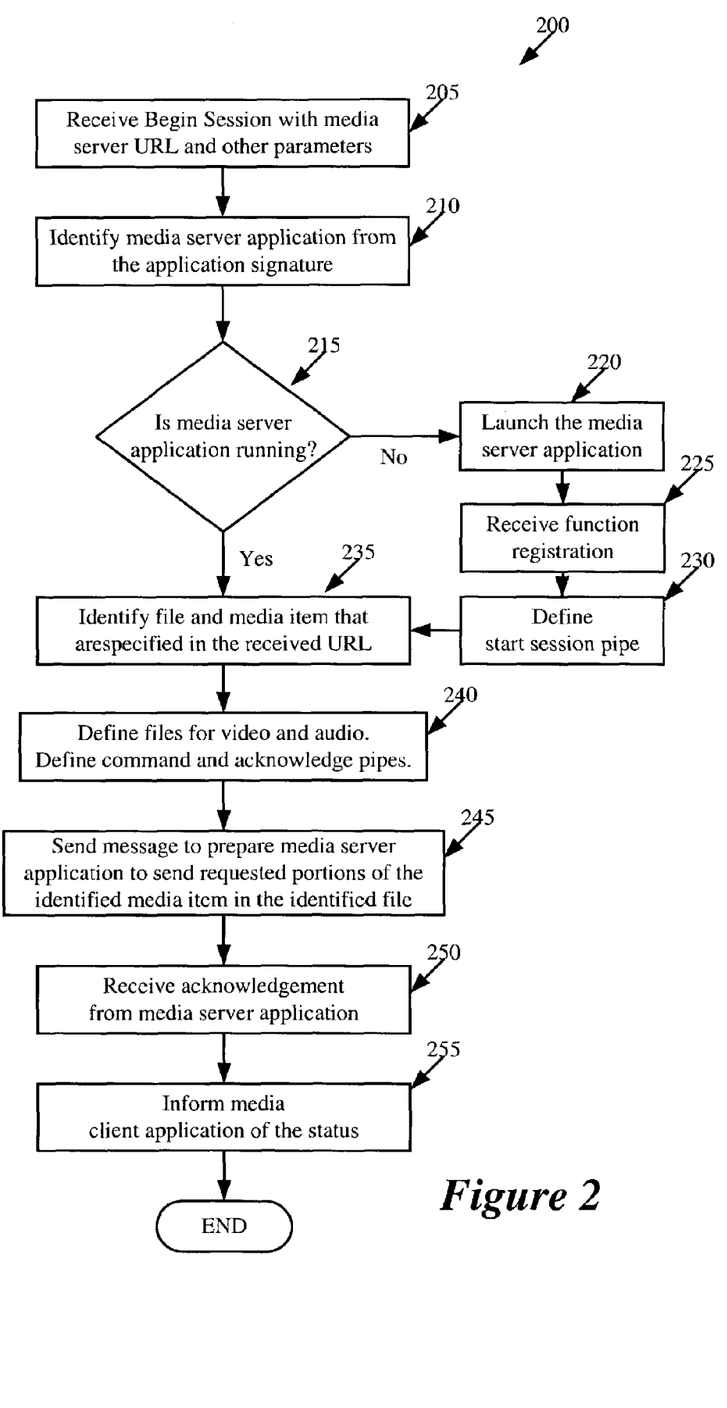
FIG. 2 illustrates a process that the media-server interface illustrated in FIG. 1 performs when it receives a Begin Session call from a media client illustrated in FIG. 1.

FIG. 2 illustrates a process 200 that the media-server interface 115 performs when it receives a Begin Session call from a media client. As shown in this figure, this process starts when the interface receives (at 205) a media server URL and certain parameters relating to the session from a media client. In some embodiments, this URL is in the following format:

mediaserver:///[filename];[application signature]&[media item]&[set of parameters related to the media item].

As indicated above, the URL is addressed to the media server interface. It initially specifies the name of the file that contains the desired media item. It then identifies the application that can read the file that is specified by the supplied file name. This URL identifies the application by providing the application's signature. In the embodiments that are implemented in an OS X® environment, the application's signature is called its bundled ID (e.g., the bundled ID of Final Cut Pro® is referred to as com.apple.finalcutpro). The URL then identifies the media item, followed by a set of parameters related to this media item. The set of parameters might include video information such as the frame rate, frame buffer information, start and end frame times, etc. This set of parameters might also include audio information, such as whether the media server should output audio data, the audio buffer information, the sample rate.

At 210, the process 200 identifies the media server application from the application signature contained in the received URL. It then determines (at 215) whether the media server application is running. If not, it launches (at 220) the media server application. As mentioned above, each time the media server launches, it registers its four functions, Begin Session, Get Video Frame, Get Audio Segment, and End Session, with the media server interface 115. Consequently, after 220, the process 200 receives (at 225) the media server's registration of its four functions, Begin Session, Get Video Frame, Get Audio Segment, and End Session. The process then assigns (at 230) a pipe for communicating the start of a session with the media server. This pipe is based on the process ID of the media server.

After 230, the process 200 transfers to 235. The process also transfers to 235 when it determines (at 215) that the media server application has already been launched. At 235, the process identifies the file and media item that are specified in the received URL. The process then defines (at 240) the audio and video files in memory. In some embodiments, the process does not identify an audio file when the media client did not request audio data for the session, and does not identify a video file when the media client did not request video data for the session. In some embodiments, the media client specifies whether it wants audio and/or video data in a session in the parameters that the media client sent outside of the URL in its Begin Session request. At 240, the process also defines command and acknowledgment pipes for the requested media session between the media server and the media client. As further described below, the media server interface uses these pipes to communicate with the media server during a session.

After 240, the process sends (at 245) a Begin Session message to the media server to prepare for rendering media data to the specified files. In some embodiments, this message is sent to the media server in an XML format that the media server can parse. The XML document contains all information that the media server needs to prepare for a media exchange session. This information specifies the type of media (i.e., audio and/or video) that the media server should render, the location (i.e., the file) that the media server should use to render audio seconds and/or video frames, the format (e.g., rowbytes, width, height) of the video memory-mapped file, the format of the audio (e.g., sampling rate, etc.) memory-mapped file, the identity of the command pipes specified at 240. In some embodiments, the media server interface 115 sends this XML document to the media server 105 along the interprocess communication (which in this case is the OS pipe) that the interface specifically specified above at 230 for the media server.

After sending the message at 245, the process 200 waits at 250 until it receives an acknowledgment from the media server application. Once it receives this acknowledgement, the process sends (at 255) an acknowledgement to the media client 110, which completes the Begin Session call of the media client. At this stage, the media server and client are ready to exchange data.

Figure 3:
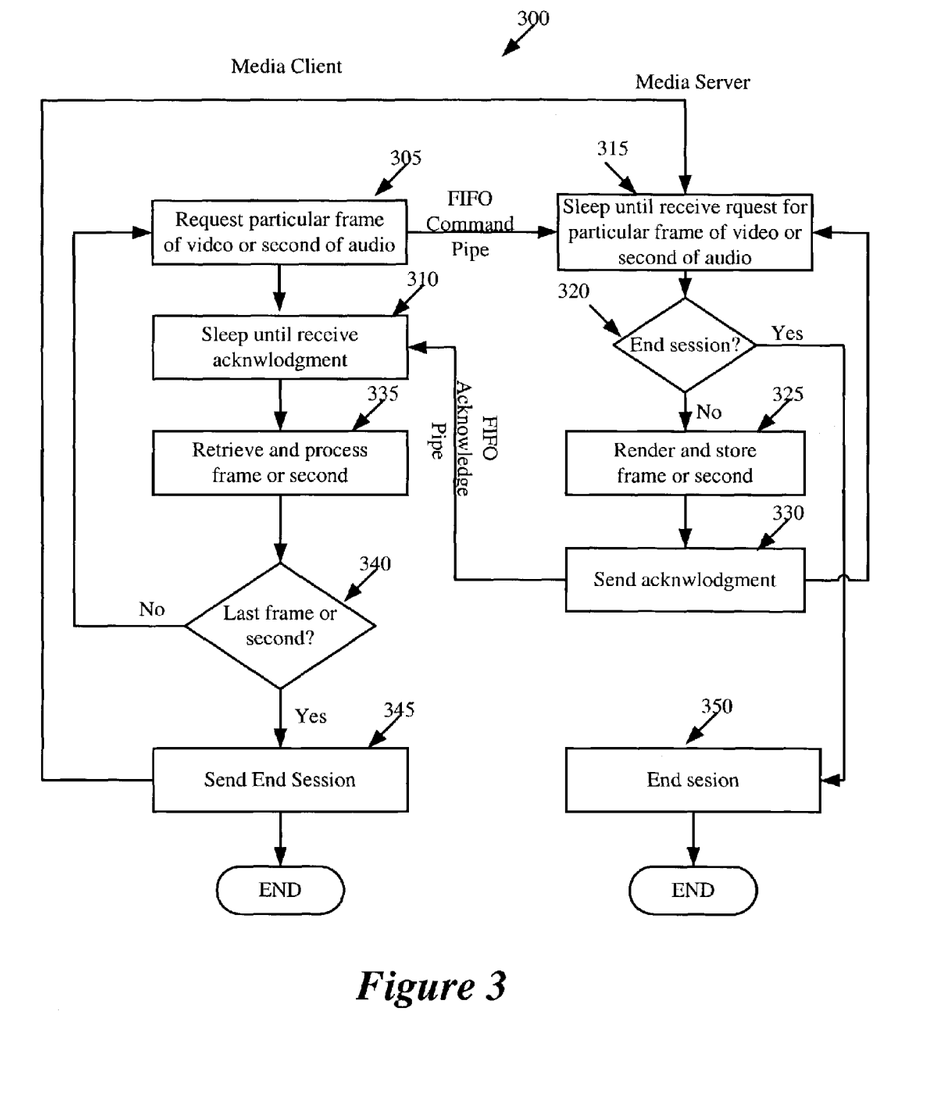
FIG. 3 conceptually illustrates the interaction between the media client and a media server illustrated in FIG. 1.
Figure 4:
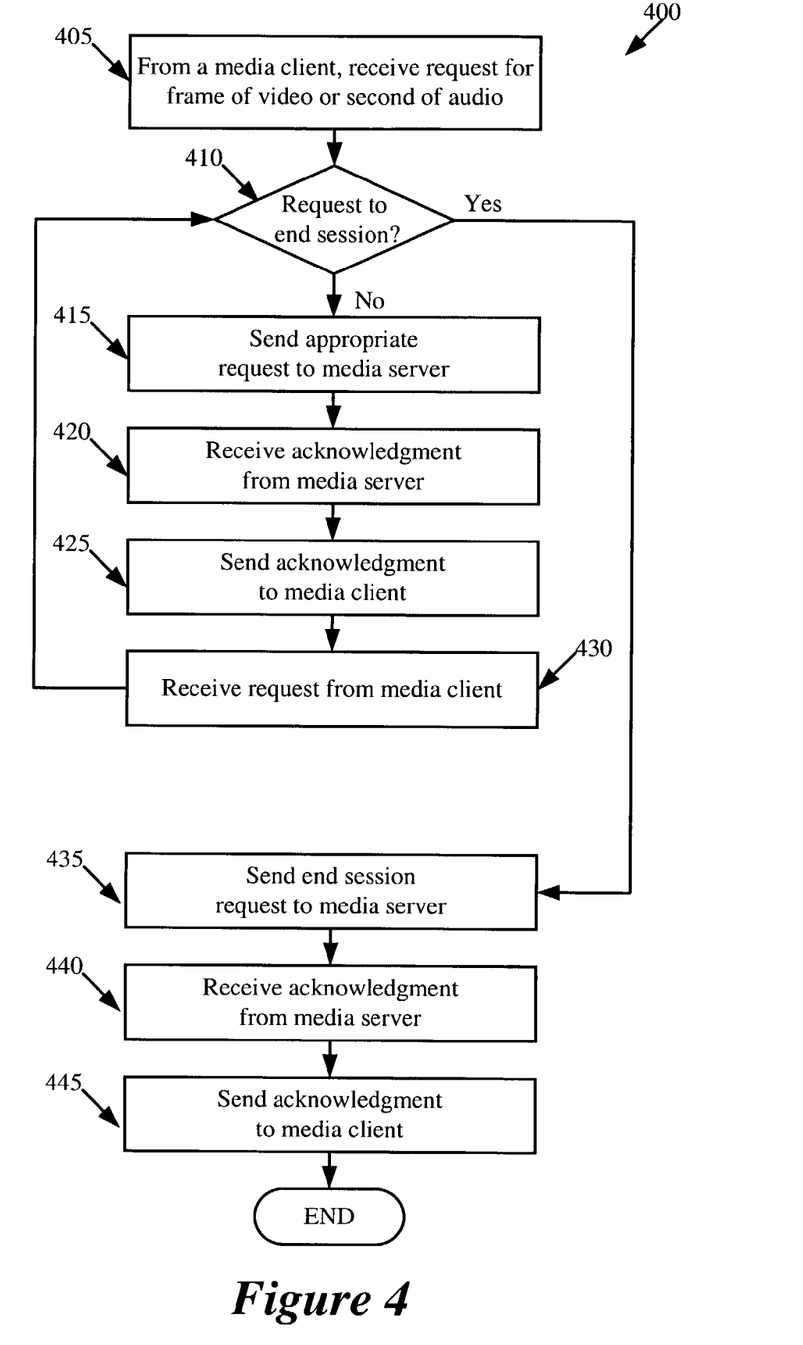
FIG. 4 illustrates the operations performed by the media-server interface in order to facilitate the interactions between the media client and server.

FIGS. 3 and 4 illustrate the processes performed by the media server 105, media client 110, and the media server interface 115 during a media exchange session. FIG. 3 conceptually illustrates the interaction between the media server 105 and the media client 110. To simplify the presentation, this figure does not illustrate the interactions with the media server interface 115, and the operations performed by this interface are illustrated in FIG. 4.

As shown in FIG. 3, a media exchange start (at 305) when the media client requests a particular media segment (i.e., frame of video or second of audio) in the specified media item of the session. As mentioned above, the media client makes this request through a Get Video Frame or Get Audio Segment call. In some embodiments, this call is sent to the media server along the fifo command pipe created at 240 by the media server interface. As shown in FIG. 3, the media client sleeps (i.e., does not perform any other operations) at 310 after sending the request at 305. As further described below, the media client stays asleep until receiving an acknowledgment from the media server.

As shown in FIG. 3, the media server receives (at 315) the request for the particular video frame or audio second. This request wakes the media server up. Next, at 320, the media server determines whether the received request is for ending the session (i.e., whether it received an End Session request). If not, the media server (at 325) renders the requested media segment (i.e., audio second or video frame), and then stores the rendered segment in the segment's corresponding file (i.e., in the video file 120 if it rendered a video frame or in the audio file 125 if it rendered an audio segment). After 325, the media server sends (at 330) an acknowledgement to the request from the media client, and then transitions back to 315, where it sleeps until the next time that it receives a request from the media client.

When the media client receives (at 310) an acknowledgement from the media server, it awakes. It then retrieves and processes (at 335) the requested video frame or audio second from the appropriate file. It then determines (at 340) whether it needs to get any additional video frame or audio second from the media server. If so, the media client requests (at 350) another video frame or audio second through a Get Video Frame or Get Audio Segment call, and then transitions to 310 to sleep and await for an acknowledgment from the media server, as described above.

When the media client determines (at 340) that it does not need to request any additional media data, it sends (at 345) an End Session message and ends its session. When the media server receives the End Session message at 315, it awakes. It then determines (at 320) that the received message is an End Session message. Hence, it transitions to 350 to end the session. To terminate such a session, the media server 105 restores its state to what it was before the session. Once the media server ends its session (and acknowledges this to the media interface, as further described below) the media server's operations in this session end, as shown in FIG. 3.

FIG. 4 illustrates a process 400 that the media server interface performs after completing the process 200 of FIG. 2 to start a session. After the media server interface completes the process 200 to start the session, it waits until it receives a request from the media client. When the media client sends its first request, the media server interface starts (at 405) the process 400.

Upon receiving this request, the media server interface determines (at 410) whether the request is an End Session request. If so, the process transitions to 435, which is further described below. If not, the request is either a Get Video Frame or Get Audio Segment request. Accordingly, the media server interface 115 calls (at 415) the media server function corresponding to the received request (i.e., calls Get Video Frame if the received request is a Get Video Frame request, or calls Get Audio Segment if the received request is a Get Audio Segment request) to the media server along the command fifo pipe that it defined at 240.

The media server interface then waits until it receives (at 420) an acknowledgment from the media server on the acknowledgment fifo pipe that it defined at 240. It then sends (at 425) to the media client an acknowledgment of the processing of its previous request. The media server interface then waits until it receives (at 430) the next request from the media client. After such a request, the media server interface then transitions to 410 to determine whether the request is one for ending the session. If not, the interface process 400 transitions to 415, which was described above.

When the process 400 determines (at 410) that a request from the media client is an End Session request, the process transitions to 435. At 435, the interface 115 calls the End Session function of the media server along the command pipe. It then receives (at 440) an acknowledgment from the media server along the acknowledgment pipe, once the media server completes its End Session function call. After receiving this acknowledgment, the interface 115 sends (at 445) to the media client an acknowledgment of the processing of its End Session request.

Figure 5:
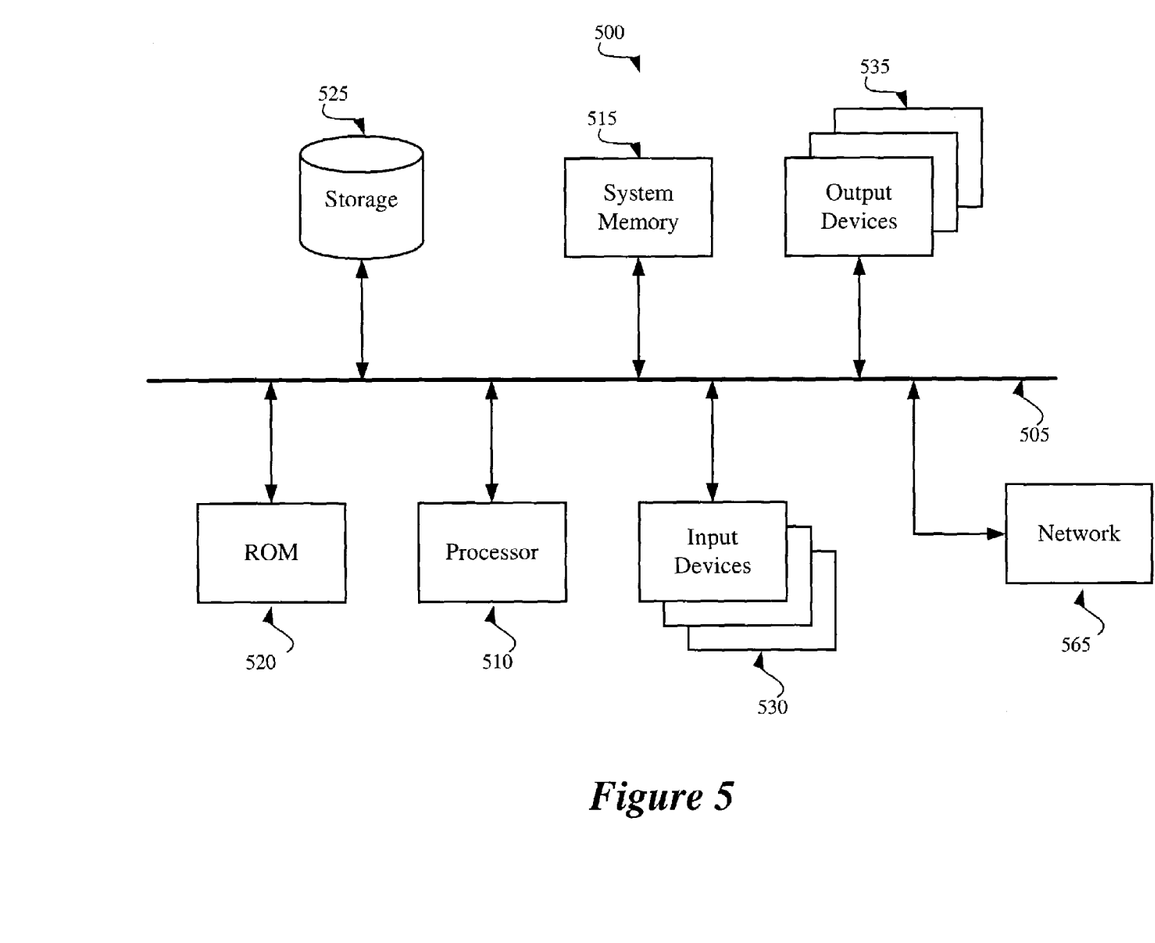
FIG. 5 conceptually illustrates a computer system that can be used to implement some embodiments of the invention.

FIG. 5 presents a computer system with which one embodiment of the invention is implemented. Computer system 500 includes a bus 505, a processor 510, a system memory 515, a read-only memory 520, a permanent storage device 525, input devices 530, and output devices 535. The bus 505 collectively represents all system, peripheral, and chipset buses that communicatively connect the numerous internal devices of the computer system 500. For instance, the bus 505 communicatively connects the processor 510 with the read-only memory 520, the system memory 515, and the permanent storage device 525.

From these various memory units, the processor 510 retrieves instructions to execute and data to process in order to execute the processes of the invention. The read-only-memory (ROM) 520 stores static data and instructions that are needed by the processor 510 and other modules of the computer system. The permanent storage device 525, on the other hand, is read-and-write memory device. This device is a non-volatile memory unit that stores instruction and data even when the computer system 500 is off. Some embodiments of the invention use a mass-storage device (such as a magnetic or optical disk and its corresponding disk drive) as the permanent storage device 525.

Other embodiments use a removable storage device (such as a floppy disk or Zip® disk, and its corresponding disk drive) as the permanent storage device. Like the permanent storage device 525, the system memory 515 is a read-and-write memory device. However, unlike storage device 525, the system memory is a volatile read-and-write memory, such as a random access memory. The system memory stores some of the instructions and data that the processor needs at runtime. In some embodiments, the invention's processes are stored in the system memory 515, the permanent storage device 525, and/or the read-only memory 520.

The bus 505 also connects to the input and output devices 530 and 535. The input devices enable the user to communicate information and select commands to the computer system. The input devices 530 include alphanumeric keyboards and cursor-controllers. The output devices 535 display images generated by the computer system. For instance, these devices display IC design layouts. The output devices include printers and display devices, such as cathode ray tubes (CRT) or liquid crystal displays (LCD).

Finally, as shown in FIG. 5, bus 505 also couples computer 500 to a network 565 through a network adapter (not shown). In this manner, the computer can be a part of a network of computers (such as a local area network ("LAN"), a wide area network ("WAN"), or an Intranet) or a network of networks (such as the Internet). Any or all of the components of computer system 500 may be used in conjunction with the invention. However, one of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, in some of the embodiments described above, each segment of the media data is either a single frame of video or a second of audio. However, one of ordinary skill will realize that in other embodiments, the media server might render at each iteration more than frames of video or more than one second of audio. Thus, one of ordinary skill in the art would understand that the invention is not to be limited by the foregoing illustrative details, but rather is to be defined by the appended claims.

I claim:

1. A computer system comprising:
   a) a media server application for producing media data, wherein the media data has a plurality of segments,
   b) a media client application for processing media data,
   c) a media-server interface for allowing the media client application to receive the plurality of segments of the media data from the media server application, the media-server interface for directing the server application to successively store each segment in a location that is accessible by the media client, wherein the server application stores each segment in a format that is comprehensible to the media client application, and the media client application retrieves each segment from the location before the server application stores another segment to the location.

2. The computer system of claim 1, wherein at least one segment is a frame of video.

3. The computer system of claim 2, wherein at least one segment is a particular duration of audio.

4. The computer system of claim 1, wherein at least one segment is a particular duration of audio.

5. The computer system of claim 1, wherein the computer system has a memory and a disk storage and the location is in the memory and not the disk storage.

6. The computer system of claim 1, wherein after retrieving each segment from the location and before another segment is written to the location, the media client processes the retrieved segment.

7. The computer system of claim 1, wherein the media server interface for further directing the server application to successively generate each segment of the media data before storing each generated segment in the location that is accessible by the media client, wherein the server application generates each segment in a format that is comprehensible to the media client application.

8. For a media client application, a method of receiving media data from a media server application that produces the media data, wherein the media data has a plurality of segments, the method comprising:
   a) directing the server application to generate one segment of the media data and to store the generated segment in a location accessible by the media client,
   b) having the media client application retrieve the generated segment,
   c) after having the media client retrieve the generated segment, directing the server application to generate another segment of the media data and to store the generated segment in the location,
   d) having the media client application retrieve the generated segment,
   e) wherein the server application stores the segments in a format that is comprehensible to the media client application.

9. The method of claim 8, wherein at least one segment is a frame of video.

10. The method of claim 9, wherein at least one segment is a particular duration of audio.

11. The method of claim 8, wherein at least one segment is a particular duration of audio.

12. The method of claim 8 further comprising:
    directing the server application to successively generate individual segments of the media data and to store each generated segment in the location that is accessible by the media client,
    having the media client application (i) retrieve each segment from the location before another segment is written to the location and (ii) process the retrieved segment.

13. A computer comprising:
    a) a disk storage;
    b) a memory;
    c) a media server application for producing media data having a plurality of segments,
    d) a media client application for processing media data,
    e) a media-server interface for directing the server application to successively store media data segments in a location in the memory for retrieval by said media client application.

14. The computer of claim 13, wherein the media server application successively generates the media data segments before storing each segment in the location in the memory, wherein the generated media data segments are in a format that is comprehensible to the media client application.

15. The computer of claim 14, wherein the media server application performs a rendering operation to generate a media data segment.

16. The computer of claim 15, wherein at least one segment is a frame of video.

17. The computer of claim 15, wherein at least one segment is a particular duration of audio.

18. The computer of claim 13, wherein the location in the memory is a file in the memory, said file accessible by both the media server application and the media client application.

19. A computer comprising:
  a) a media server application for producing media data having a plurality of segments,
  b) a media client application that processes the media data,
  c) a media-server interface that directs the server application to successively generate segments of the media data in a format that is comprehensible to the media client application and to store the generated segments in a location accessible by the media client,
  wherein the media client application retrieves and processes the generated segment,
  wherein the media server application, media client application, and media-server interface are applications running on said computer.

20. A method for transferring media data from a media server application to a media client application in a single session, said media data having a plurality of media segments, the method comprising:
  a) utilizing a begin session command to denote the start of the session;
  b) successively utilizing a get-data command to successively direct the media server application to store media segments in a location accessible to the media client application;
  c) utilizing an end session command to denote the end of the session.

21. The method of claim 20, wherein the get-data command requests the next segment of audio data.

22. The method of claim 20, wherein the get-data command requests the next segment of video data.

23. The method of claim 20, wherein the get-data command is a first type of get-data command for requesting the next segment of video data, the method further comprising successively utilizing a second type of get-data command, said second type of get-data command for successively directing the media server application to store audio segments in the location accessible to the media client application.

* * * * *